Sept. 15, 1959  K. C. GAYNOR  2,903,978
TRANSPORTATION SYSTEM
Filed April 13, 1955  5 Sheets-Sheet 1

INVENTOR.
Keyes C. Gaynor
BY Louis O. French
Att'y.

Sept. 15, 1959　　　K. C. GAYNOR　　　2,903,978
TRANSPORTATION SYSTEM
Filed April 13, 1955　　　　　　　　　　　5 Sheets-Sheet 3

INVENTOR.
Kayes C. Gaynor
BY Louis O. French
Atty.

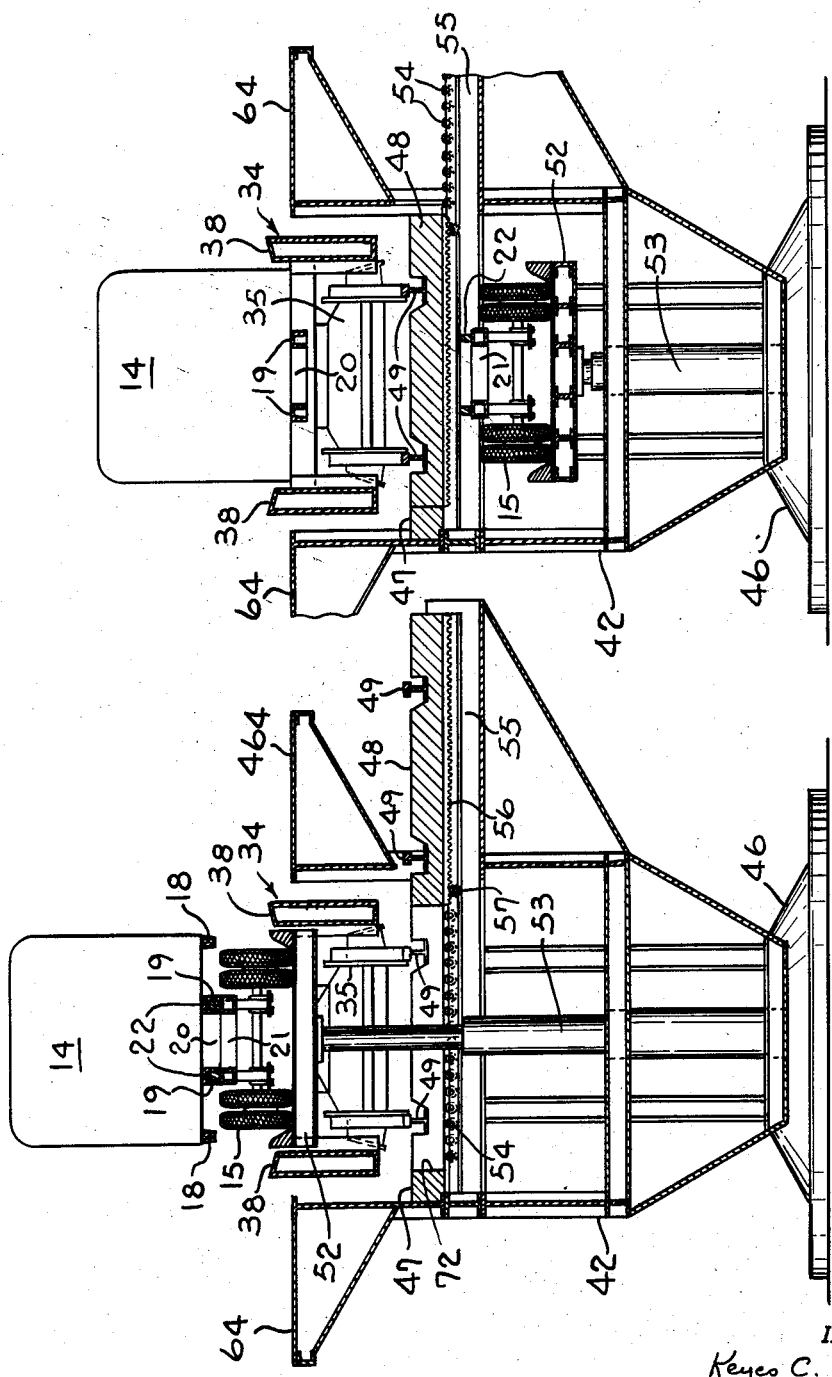

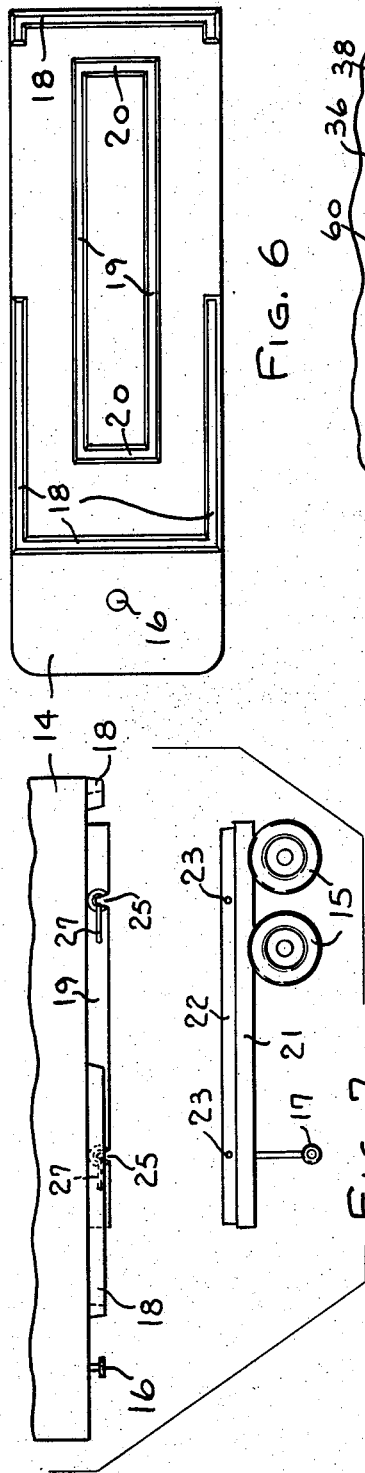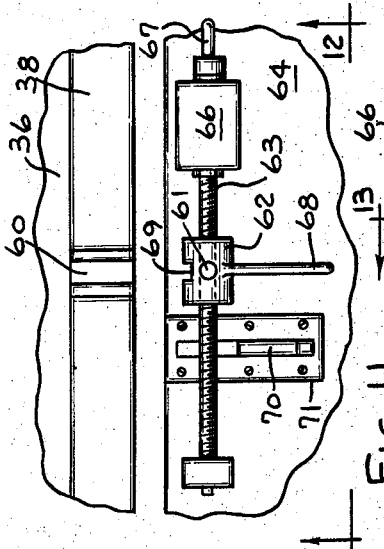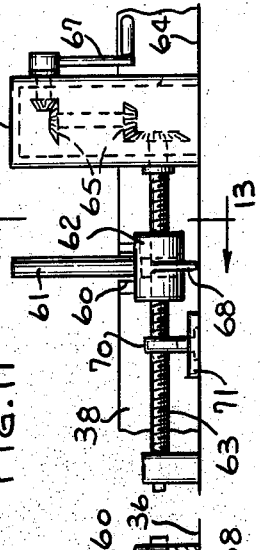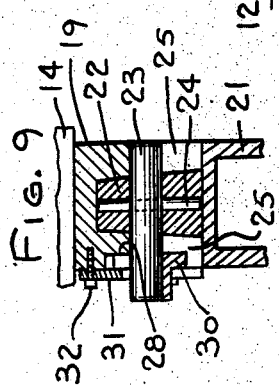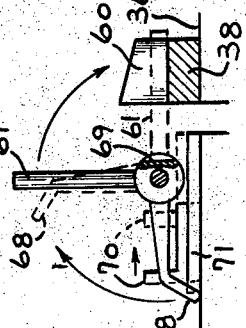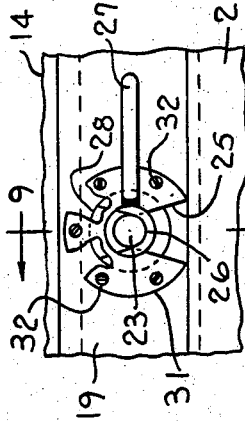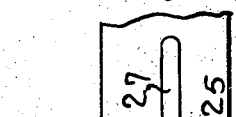

2,903,978

TRANSPORTATION SYSTEM

Keyes C. Gaynor, Sioux City, Iowa

Application April 13, 1955, Serial No. 501,122

4 Claims. (Cl. 105—368)

The invention relates to a transportation system and more particularly to a system for loading and unloading and transporting automobile trucks on rail cars.

It has been the usual practice in the transportation of trailer trucks to load the truck with its running gear onto a flatcar and transport the loaded truck to its destination where it is removed from the flatcar. The running gears of trailer trucks, thus transported, represent a considerable amount of weight that has to be carried by the hauling train that is not a pay load. One object of the present invention is to provide means at a loading and unloading station whereby the running gears of the trailer trucks may be removed from them when they are being loaded on flatcars as outgoing freight and may be attached to them prior to unloading them from the flatcars as incoming freight, thus effecting considerable savings to the railroad and hence the shippers in hauling expense.

The invention further consists in the several features hereinafter described and more particularly defined by claims at the conclusion hereof.

In the drawings:

Fig. 4 is a section taken on the line 4—4 of Fig. 1;

Fig. 5 is a sectional view similar to Fig. 4 showing the trailer truck in loaded position;

Fig. 6 is a bottom plan view of a trailer truck body;

Fig. 7 is a detailed side elevation view of a truck body and its running gear;

Fig. 8 is an enlarged side elevation view of a running gear fastening, parts being broken away;

Fig. 9 is a detailed vertical sectional view taken on the line 9—9 of Fig. 8;

Fig. 10 are side elevation views of the open and closed lock;

Fig. 11 is a detailed plan view of a car spotting mechanism;

Fig. 12 is a side elevation view of this mechanism;

Fig. 13 is a detailed vertical sectional view taken on the line 13—13 of Fig. 12;

Fig. 14 is a plan view of apparatus embodying the invention showing certain modifications.

Figure 1:
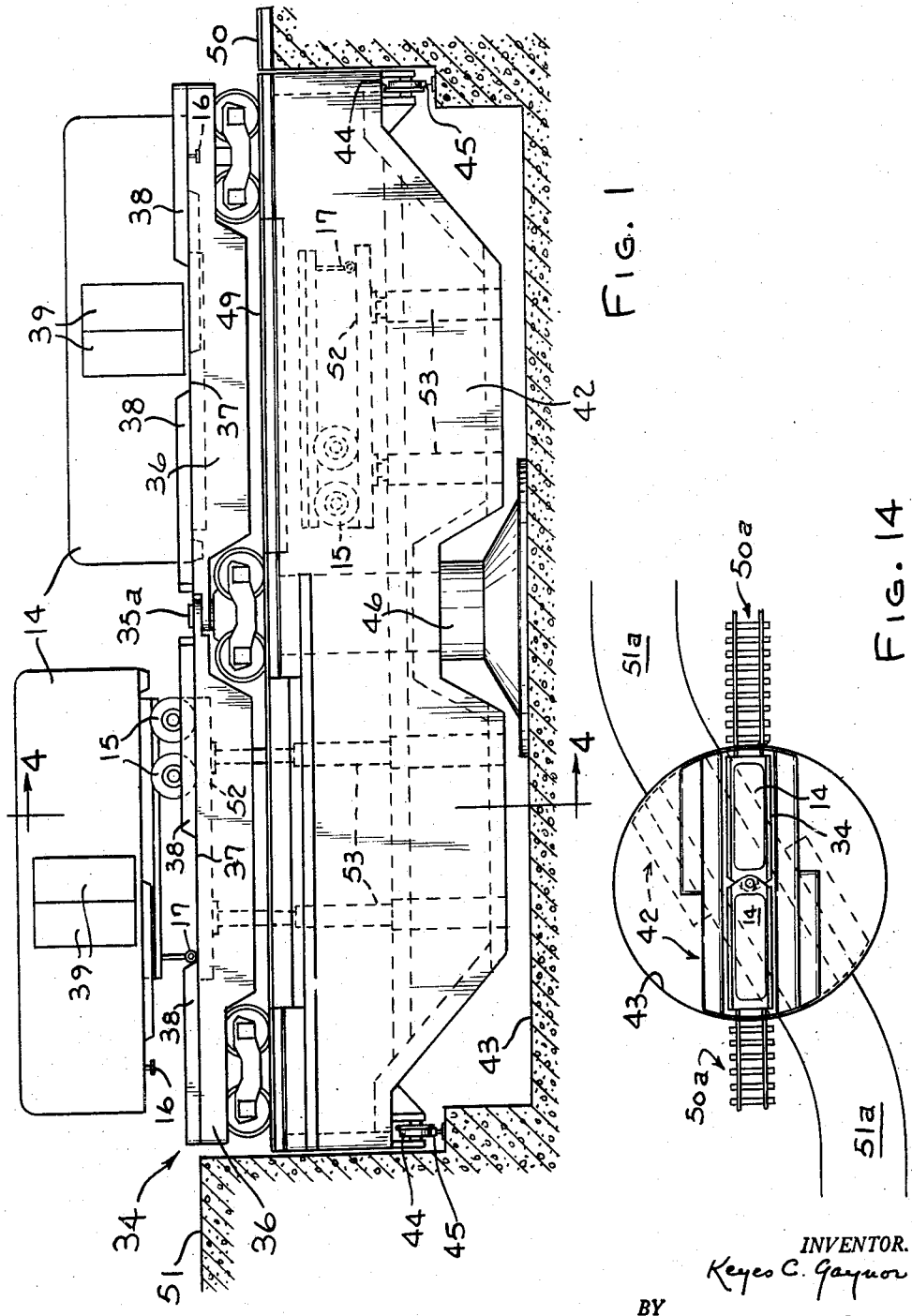
Fig. 1 is a side view of apparatus embodying the invention, the approaches being shown in section.

Referring to Fig. 1, the numeral 14 designates an automobile trailer or trailer truck which is preferably of the type having rear wheels 15, a front king pin 16, and the usual foldable front landing gear wheels 17, said truck being of the type for the mounting of the pin 16 in the fifth wheel of a tractor truck, so that the trailer truck may be moved thereby. Unlike the ordinary trailer truck, the truck 14 is preferably provided with tapered ribs 18 at its sides and at least at one end which depend below the bottom of the body of the truck as shown in Fig. 4. Also as shown in Figs. 5 to 9, the running gear of the truck is detachably connected to its body. As a suitable detachable connection I have shown the bottom of the truck provided with depending side channels 19 and one or more end channels 20. The rear wheels 15 and wheels 17 are mounted on a running gear frame 21 that has upstanding tapered ribs 22 adapted to fit in the tapered channels 19 and 20. At spaced intervals the side ribs 22 have transversely extending pins 23 secured thereto as by pins 24, said pins 23 adapted to register with tapered notches 25 in the side channels 19. At one side of each notch 25 and axially alined with the curved upper end thereof a notched bushing 26 carrying an exteriorly disposed operating lever 27 is mounted. Each bushing 26 is held in operative position on its channel by providing an annular recess 28 in the outer side of the channel flange for the flange 30 of the bushing to work in and a notched cover plate 31 secured by screws 32 to the outer side of the channel flange and extending over the front face of the flange 30. The notch 33 of the bushing is of the same contour as the notch 25 so that when these notches are in register, the pin 23 on the running gear may be moved up into the back end of the notch as indicated in the left hand view of Fig. 10 and then the lever 27 swung to the position shown in the right hand view of Fig. 9 to reverse the position of the notch 33 and thus hold the pin between the inner ends of the notches 25 and 33 and thus lock the running gear frame to the channels 19 on the bottom of the trailer truck.

The railcar 34, such as a so-called flatcar, may be of a length to carry a single trailer truck or of a length to take two trailer trucks, the latter being shown. Since the present system includes openings in the bottom of the railcar, and it becomes a difficult engineering problem to provide a properly reinforced single unit flatcar for two trailer trucks, I have in the present instance overcome this problem of stress distribution to accommodate said openings by forming the flatcar 34 as an articulated car unit having a central rail truck 35 and a king pin 35a operatively connecting the inner ends of the car sections 36 to this truck, thus reducing the over all lengths of the car sections between their supports.

Each section 36 of the railcar 34 has a flat top 37 provided with side rails 38 running inwardly from each end to a position clear of the doors 39 of the trailer truck 14, as shown in Fig. 1, so that these doors can be opened, if desired, for loading, unloading, or inspection purposes. Each section 36 has an opening 40 to allow passage of running gear down through the top of the railcar and also passage of an elevator platform as hereinafter described. Each section also has depressions 41 which are complementary to the ribs 18 on the trailer body so that in the lowered position of the trailer on the flatcar, the ribs 18 engage in the complementary depressions 41 in the top portion of the railcar, so that said ribs interlock therewith, said ribs and depressions preferably being tapered to insure a proper alinement between the ribs and said depressions as the trailer truck is lowered to a carrying position. Suitable hold down clamps between the truck and the railcar may also be provided.

At each rail terminus of the system, a loading and unloading structure is provided. While this structure might be a fixed structure, for the expeditious loading and unloading of two-trailer railcars it is preferably in the form of a turntable 42 mounted in a pit 43 and provided with wheels 44 running on circular guide rails 45, a central pivot 46 with suitable means (not shown) for turning it. The turntable 42 includes a flat top platform 47 which includes movable sections 48, these sections and the other parts of the platform adjacent thereto having rails 49 mounted thereon which connect at one point with rails 50 of a railroad siding, so that a railcar 34 may be driven onto or off of said platform. A highway approach 51 leads to the platform 47 at another point and is at a higher elevation than the rail approach and at a height which permits driving a trailer vehicle 14 from this approach onto the top 37 of the railcar 34. With this turntable arrangement turning of the platform 47 relative to the approach 51 permits first one and then the other of the trucks or vehicles 14 to be backed into position on the flatcar 34, so that the running gears of each truck will be disposed over the openings 40 upon an elevator platform 52.

The platforms 52 may be raised and lowered relative to the turntable by any suitable power operated hoist mechanism, and in the present instance I have shown hydraulic hoists for each platform including telescopic hydraulic hoist cylinders 53 for each platform adapted through suitable valve controlled connections with a hydraulic fluid system to raise or lower said platforms.

Figure 3:
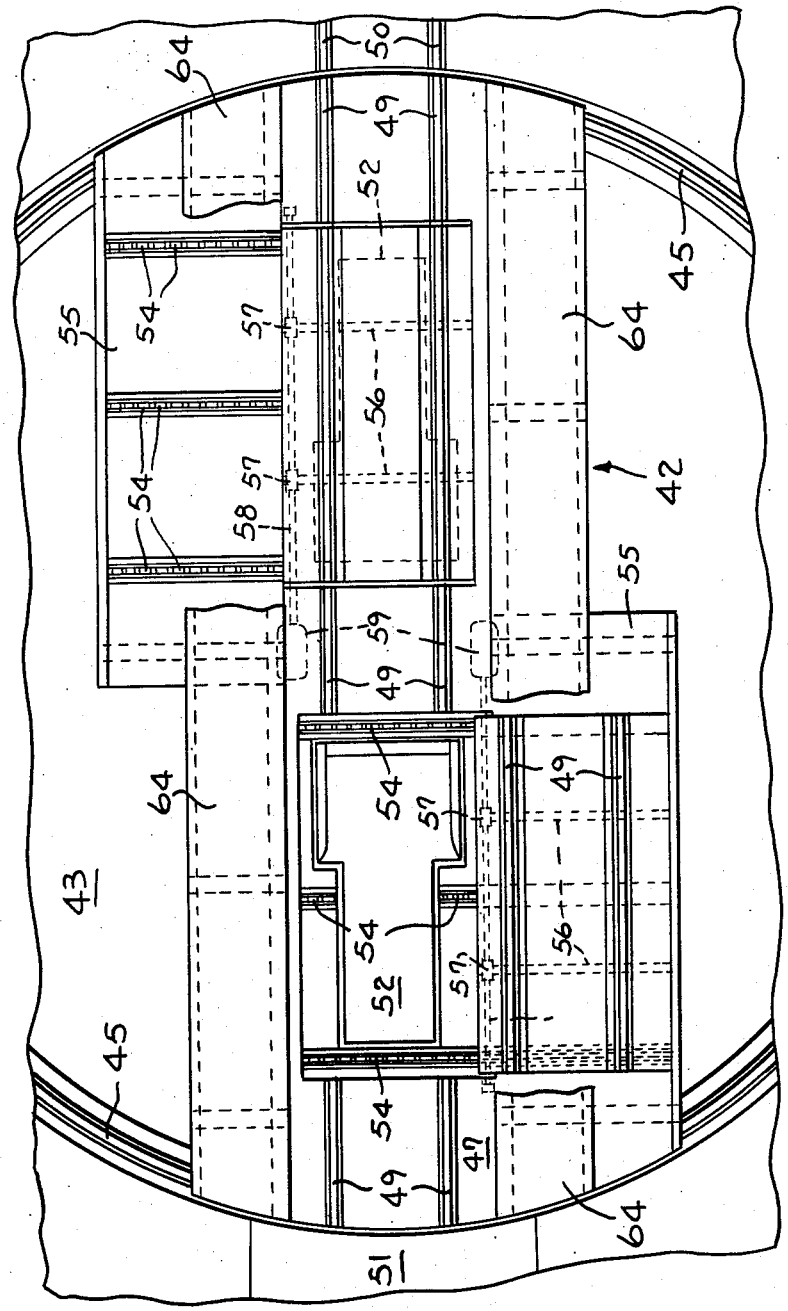
Fig. 3 is a plan view of the apparatus, parts being broken away.

Each movable rail carrying section 48 of the platform 47 is mounted for lateral movement relative to the main body of the platform on a series of spaced sets of rollers 54, three sets of rollers being shown, one set being adjacent each end of the section and the other being at the central portion thereof, these rollers being mounted on a lower platform 55 which extends outwardly at one side of the turntable. As a power means for moving each section, racks 56 may be mounted thereon that mesh with gears 57 on a motor driven shaft 58. A drive motor 59 is indicated in Fig. 3 and may be a hydraulic or electrically operated motor.

In order to accurately line up the openings in the flatcar with the platforms in the turntable, means are provided for spotting the flatcar on the turntable. Referring to Figs. 11 to 13, each section of the flatcar has a groove 60, either groove adapted to receive a pin 61 on a collar 62 threaded to engage a screw shaft 63 suitably journalled at its ends in bearings mounted on one of the catwalks 64. For turning the shaft 63 I have shown it connected by gearing 65 in a housing 66 with a hand crank 67. A handle member 68 is also connected to the collar 62 which also has a flat faced groove 69 therein that cooperates with a lock pin 70 slidably mounted on a fitting 71 on the catwalk. With the above construction, if a flatcar that is driven onto the table is in the position in which the notch 60 does not aline with the lock pin 70 but is in an offset position as shown in Fig. 11, then the screw 63 is turned by the crank 67 to bring the collar 62 to the position shown so that by swinging the lever 68 the pin 61 can be swung down into the notch 60 to couple the flatcar to the collar 62 which is then moved to the left as viewed in Fig. 11 by again turning the screws 63 by the crank 67 until the notch 60 on the flatcar alines with the lock pin 70 as indicated in dotted in Fig. 13, and then since the flattened notch 69 on the collar 62 is then alined with the pin 70, this pin may be pushed forwardly into the notch 69 to lock the flatcar in proper position on the turntable during a loading or unloading operation.

Referring to Fig. 14, in order to provide a straight through track, the rails 50a on opposite sides of the turntable aline with each other and the highway approaches 51a, similar to the approaches 51, are disposed adjacent to but on opposite sides of the rails 50a and at elevations alined with the tops of the flatcars.

Figure 2:
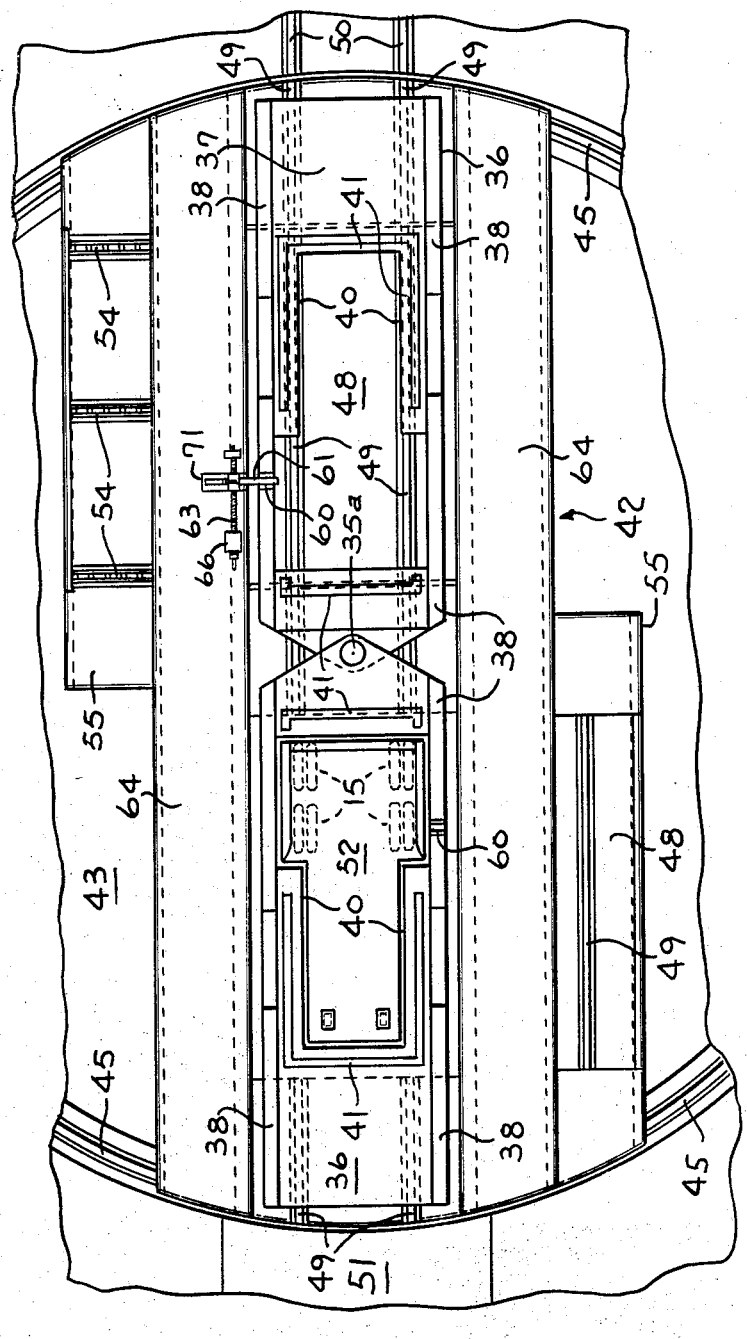
Fig. 2 is a plan view of the apparatus.

With the present system, after an empty railcar 34 has been driven onto the platform 47 and moved into proper position, if necessary, by the car spotter above described, the movable section 48 of this platform is moved laterally to one side so as to leave an opening 72 in the platform through which the hoist platform 52 is raised to a position to bring it level with the top of the railcar 34. The turntable is then swung to line up with the approach 51 and a trailer truck 14 is then driven onto the flatcar so that its running gear lines up with the platform 52 as indicated in Fig. 2. The locks previously described for the running gear are then released by the operation of the levers 27. The hoist mechanism is then operated to lower the platform and with it the trailer vehicle 14 until the ribs 18 of the trailer engage in the depressions 41 of the flatcar. Then the platform 52 is lowered still further carrying the running gear of the trailer with it to a position below the rail section 48. The rail section 48 is then moved back to its rail connecting position. The turntable is then swung around so that similar operations can be performed to load another trailer onto the other end or section of the railcar and then the loaded car can be hauled off the turntable to a train make up point. When the track extends straight through as indicated in Fig. 14, the loading or unloading is done from each end of the apparatus and the turntable only has a short arc of movement to bring it into line with either the rail siding or the adjacent highway approach. It is contemplated that at each terminus there are a number of loaded trailer vehicles ready to be loaded onto flatcars and that there is an incoming freight train of loaded trailer trucks on flatcars to be unloaded. A loaded flatcar of the incoming train is then switched onto the railroad siding leading to the turntable and then driven onto the turntable. The platform 52 with the running gear for an outgoing trailer vehicle thereon is then moved up by the hoist cylinders 53 to bring the ribs 22 into register with the tapered channels 19 and 20 of the trailer vehicle on the flatcar. Then the locks for securing the running gear to the trailer truck are operated and then the platform 52 with the loaded trailer thereon is raised up to bring it to the level of the platform 47 so that after a similar operation on the loaded trailer vehicle at the other end or section of the flatcar, the loaded trailer vehicles may be driven off the platform 47 by tractor vehicles backed in from the approach 51. A loaded outgoing trailer vehicle is then loaded onto the previously unloaded flatcar as above described, the running gear for these vehicles being used in the unloading of another flatcar of the incoming train. Thus the operation of unloading incoming trailer vehicles from loaded freight cars and loading loaded outgoing trailer vehicles onto empty freight cars of the incoming train proceeds alternately until an outgoing train is fully made up. Thus at any terminus the running gear serves two trailer trucks, it being used on the trailer truck to be loaded onto the flatcar to bring this truck to the flatcar and on a trailer truck unloaded from a flatcar to bring this truck to a point of destination.

In the initial loading of the flatcars at one terminus the running gears of the loaded trailers will have to be removed from the loading platform after each flatcar is loaded, and for this purpose an empty flatcar may be driven onto the platform at this terminus and the running gears then on the platforms 52 raised to the level of the top of the flatcar from which they may be removed by a suitable load handling tractor and carried to a place for storage. Instead of this procedure a special low level approach (not shown) to opposite sides of a terminus turntable may be provided so that a removed running gear may be transferred to a load handling tractor operating on this low level approach.

I desire it to be understood that this invention is not to be limited to any particular arrangement or construction of parts except in so far as such limitations are included in the claims.

What I claim as my invention is:

1. In a railway transportation system including a main track, the combination of a trailer truck comprising a body and a detachable running gear and supporting frame therefor, fastening means for detachably securing said frame to the underside of said body, said body having an overall plan size larger than the overall plan size of said frame and of said running gear to provide laterally overhanging body portions; a flat-type railcar including a flat deck having a deck opening therein defined by a marginal periphery of a size conforming at least to the said plan size of said running gear and frame to permit passage of said frame and gear therethrough, said deck further providing body supporting areas adjacent said opening; a supporting platform for receiving said railcar including a pair of track rails arranged to be disposed in operatively adjacent position relative to and forming a continuation of said main track, said platform comprising a laterally movable section including a predetermined length of said platform rails and adapted for transverse movement laterally of the remaining track length of said platform rails into and out of operative position, said section being substantially of the plan size of said frame and running gear and arranged for longitudinal alignment of said rail pairs for receiving said railcar when said section is in operative position below said railcar deck opening, and adapted to present an unobstructed opening in said platform beneath said railcar deck opening when in inoperative position; a support structure for said platform, a vertically movable elevator disposed and supported within said support structure, means for moving said elevator upwardly and downwardly, and a substantially horizontal loading surface for said elevator arranged for vertical alignment with said railcar deck opening and being further arranged for upper limit positioning at the level of said railcar loading deck and within the opening therein on upward vertically directed movement of said elevator through the opening in said platform when said movable section is disposed in an inoperative position, whereby said elevator loading surface may receive and support said trailer truck at the level of said railcar deck surface and may be moved downwardly through the railcar deck opening to permit the overhanging truck body portions to be supported on said body supporting areas of said deck adjacent the said deck opening, and may thereafter be continued in its downward movement with said fastening means being positioned to detach said body from said frame and running gear, while supporting only said frame and running gear, to a lower level at which position the said platform section may clear the upward extending surfaces of said frame and running gear to be returned to said operatively adjacent position to permit said railcar, while supporting only said truck body, to be moved onto the said main track section.

2. The transportation system as defined in claim 1 wherein said railcar is provided with a pin-engaging attachment at one side thereof, and wherein said supporting platform includes railcar spotting means at the upper side thereof, said spotting means comprising a projecting movable pin arranged for releasable engagement with said pin-engaging attachment on said railcar when positioned in alignment therewtih, said spotting means further comprising a pin positioner arranged for moving said pin longitudinally of said railcar when said railcar is positioned on said platform into said alignment relationship with said pin-engaging attachment and being further arranged for moving said pin in a direction parallel with the rails on said platform during engagement of said pin and said pin-engaging attachment, to thereby concurrently move the railcar on the rails for vertical alignment of said railcar deck opening with the movable section of said platform when said section is in said operative position.

3. The transportation system as defined in claim 1, wherein said supporting platform is provided with an outwardly extending auxiliary platform positioned laterally adjacent to and below said movable section when the section is in operative position and adapted to support said section upon movement thereof to said inoperative position, and means for moving said movable section into and out of its operative position laterally relative to said auxiliary platform.

4. In a railway transportation system including a main track, the combination of a trailer truck comprising a body and a detachable running gear and supporting frame therefor, fastening means for detachably securing said frame to the underside of said body, said body having an overall plan size larger than the overall plan size of said frame and of said running gear to provide laterally overhanging body portions; a two trailer flat-type railcar including a flat deck having a pair of longitudinally spaced deck openings therein each opening being defined by a marginal periphery of a size conforming at least to the said plan size of said running gear and frame to permit passage of said frame and gear therethrough, said deck further providing body supporting areas adjacent each of said openings; a rotatable turntable including a supporting platform for receiving said railcar and have a pair of fixed track rails thereon, said rails arranged to be disposed in operatively adjacent position relative to and forming a continuation of said main track when said turntable is operatively positioned to receive said car on said platform, said platform further comprising a pair of laterally movable sections each including a predetermined length of said platform rails and each being adapted for transverse movement laterally of the remaining track length of said platform rails into and out of operative position, each of said sections being substantially of the plan size of said frame and running gear and arranged for longitudinal alignment of said rail pairs for receiving said railcar when a respective one of said sections is in operative position and below said railcar deck opening, and each being adapted to present an unobstructed opening in said platform beneath said railcar deck opening when in inoperative position; a support structure for said turntable, means for rotating said turntable; a highway approach to said turntable at the level of said railcar deck; a pair of vertically movable elevators disposed and supported within said support structure, means for moving each of said elevators upwardly and downwardly, and a substantially horizontal loading surface for each of said elevators arranged for vertical alignment with a respective railcar deck opening and being further arranged for upper limit positioning at the level of said railcar loading deck and within said respective opening therein on upward vertically directed movement of said elevator through the said respective opening when a respective movable section is disposed in an inoperative position, whereby two trailer trucks may be loaded on said railcar deck from said highway approach when said turntable is suitably rotatively positioned relative thereto, and whereby a respective elevator loading surface may receive and support a respective one of said trailer trucks at the level of said railcar deck surface and may be moved downwardly through a respective railcar deck opening to permit the overhanging truck body portions to be supported on said body supporting areas of said deck adjacent the said respective deck opening, and thereafter with said fastening means being positioned to detach said body from said frame and running gear, while supporting only said frame and running gear, to a lower level at which position the said platform section may clear the upward extending surfaces of said frame and running gear to be returned to an operative position to permit said two trailer railcar, while supporting the bodies only of respective trucks, to be moved onto the said main track section.

References Cited in the file of this patent

UNITED STATES PATENTS

| Re. 16,989 | Waters | June 5, 1928 |
|---|---|---|
| 589,724 | Hess | Sept. 7, 1897 |
| 1,058,251 | Moller | Apr. 8, 1913 |
| 1,734,303 | Ross | Nov. 5, 1929 |
| 1,911,771 | Reid | May 30, 1933 |
| 2,305,444 | Pond | Dec. 15, 1942 |
| 2,489,024 | Gaynor | Nov. 22, 1949 |
| 2,605,007 | Gaynor | July 29, 1952 |
| 2,715,971 | Cox | Aug. 23, 1955 |
| 2,756,073 | Bridge | July 24, 1956 |
| 2,783,900 | Roberts | Mar. 5, 1957 |
| 2,787,971 | Obes | Apr. 9, 1957 |